350-3.66 SR
OR 3,614,190

United States Patent

[11] 3,614,190

| | | |
|---|---|---|
| [72] | Inventor | Kenneth A. Haines<br>Hockessin, Del. |
| [21] | Appl. No. | 811,438 |
| [22] | Filed | Mar. 28, 1969 |
| [45] | Patented | Oct. 19, 1971 |
| [73] | Assignee | Holotron Corporation<br>Wilmington, Del. |

[54] UNDISTORTED IMAGE DEMAGNIFICATION BY HOLOGRAPHIC INFORMATION SAMPLING
7 Claims, 5 Drawing Figs.

[52] U.S. Cl. .................................................... 350/3.5
[51] Int. Cl. .................................................... G02b 27/22
[50] Field of Search. ......................................... 350/3.5

[56] References Cited
OTHER REFERENCES

Meier, J. Opt. Soc. Am., Vol. 55, No. 8, pp. 987– 992 (8/1965)

Preston et al., Applied Physics Letters, Vol. 10, No. 5, pp. 150– 152 (3/1967)

Haines et al., Proceedings of the IEEE, pp. 1512– 1513 (8/1967)

Burckhardt, J. Opt. Soc. Am., Vol. 58, No. 2, pp. 241– 246 (2/1968)

Lin, 58 J. Opt. Soc. Am. 1539– 1540 (11/1968)

Kock, Proceedings of the IEEE, pp. 1103– 1104 (6/1967)

Thurstone, Proceedings of the IEEE, pp. 768– 769 (4/1968)

*Primary Examiner*— David Schonberg
*Assistant Examiner*— Robert L. Sherman
*Attorney*— Woodcock, Washburn, Kurtz & Mackiewicz ABSTRACT: A technique of periodically sampling holographic information to construct a reduced size hologram with the sampled information being joined side-by-side from which a demagnified image of the original object is reconstructed.

UNDISTORTED IMAGE DEMAGNIFICATION BY HOLOGRAPHIC INFORMATION SAMPLING

BACKGROUND OF THE INVENTION

This invention relates generally to holography. A good general discussion of basic holographic techniques is presented by Leith and Upatnieks in the Scientific American, June, 1965, Vol. 212, No. 6.

In many holographic applications, it has been found desirable to reduce the size of the reconstructed image from that of the original object or object scene. This would be especially desirable in a holographic television transmission system wherein the size of the object scene is larger than can be displayed on a television screen. With present television techniques, lenses may be used for this purpose but in lensless holography other techniques must be devised.

There are several known techniques in holography for controlling the magnification of the image. For example, if an ordinary hologram is reconstructed with radiation of a wavelength different than the radiation wavelength used in constructing the hologram, the image reconstructed will be a different size than the object recorded. However, this technique, as well as others, suffers from the disadvantage that the image is not demagnified or magnified the same amount in all directions. The result is a distorted image of the original object. Such distortion may be acceptable for certain holographic applications and in others it may be corrected satisfactorily by appropriate lenses. However, in applications where distortion of the image cannot be tolerated and where correction is impossible or inconvenient, it is desirable to reconstruct an undistorted demagnified image directly from a hologram.

It is a primary object of this invention to provide a method of undistorted image reduction in holography that is simple to carry out.

SUMMARY OF THE INVENTION

This and additional objects are realized according to the techniques of this invention wherein a hologram is formed by periodically sampling information within a hologram aperture and joining these sampled portions together to form a hologram of size reduced from that of the hologram aperture. The sampled portions of the hologram aperture all have approximately equal dimensions and are distributed periodically throughout the hologram aperture. The ratio of a dimension of the sampled areas to the period of occurrence of the sampled areas across the hologram aperture is equal to the magnification factor of the image. That is, the reconstructed image of the object will be a size in all dimensions equal to the size of the object multiplied by the magnification factor. The reduced size hologram is illuminated with reconstructing radiation having a radius of curvature approximately equal to that of the reference radiation used in constructing the hologram multiplied by the magnification factor.

It should be noted that this technique maintains the viewing angle that would exist if a hologram were made in the hologram aperture according to normal techniques. However, something must be lost by throwing away part of the information of the hologram aperture and this is image resolution. Resolution degradation for many applications is of no great concern since resolution capabilities of ordinary holographic techniques are much greater than that often needed.

The hologram reduction technique according to this invention has a further advantage of data reduction. That is, using less than all the information of an object contained in a defined hologram aperture reduces the data that need be transmitted to reconstruct an image of the object and thus reduces the time-bandwidth requirements of a transmission system such as would be used in television. Hologram data reduction by sampling is described generally by C. B. Burckhardt, in the Journal of the Optical Society of America, Vol. 58, No. 2, Pg. 241, Feb., 1968, but there is no suggestion of making a reduced size hologram by joining the sampled areas together side by side.

Certain discontinuities exist in the reduced size hologram at the juncture between sampled areas. Therefore, an image reconstructed from such a reduced size hologram may appear as if it were being viewed through a screen. However, if the size of the sampled areas are made equal to or less than the smallest resolvable element of the image, this screen effect will not be noticeable. Ordinarily, satisfying this criteria is difficult to accomplish since ordinary techniques of holography are capable of resolving very small elements of the image. However, a technique may be used to purposely degrade the resolution capability of the hologram and thus increase the resolution element size. For example, dispersion medium techniques of space-spatial frequency product reduction may be used, which are described by K. A. Haines in a copending patent application filed Mar. 21, 1969. These techniques are also described by K. A. Haines in coauthored papers that may be found in the literature, Proceedings of the IEEE, Aug., 1967, pgs. 1512-1513, and in Applied Optics, June, 1968, pgs. 1185-1189. Such a combination of data reduction and image demagnification techniques is made practical in a holographic television system because the resolution capabilities of holography are far greater than that of television. The smallest resolvable element of the image is made large enough so that the sampled areas of the hologram aperture (which are made approximately equal to this smallest resolvable element) may be made large enough to be practical.

For a more detailed understanding of the invention and for illustration of various specific forms thereof, reference should be made to the following description taken in conjunction with the accompanying drawings.

DESCRIPTION OF THE PREFERRED EMBODIMENTS

Figure 1:
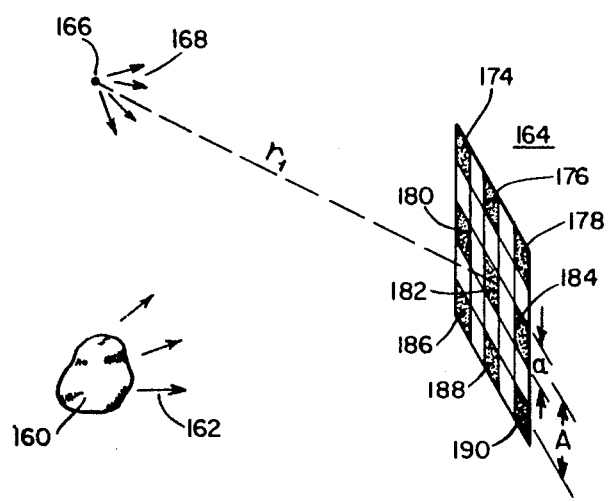
FIG. 1 illustrates hologram construction by sampling.

Referring to FIG. 1, an object 160 is illuminated with coherent radiation (not shown) to produce object-modified radiation 162 which strikes a hologram aperture 164. An actual or apparent reference point source 166 generates reference radiation 168 coherent with the radiation which illuminates the object and is located a distance $r_1$ from the center of the hologram aperture. Reference radiation 168 and the object modified radiation 162 interfere at the hologram 164, thereby generating holographic information of the object in the form of an interference pattern. In holography, reference radiation serves as a standard against which the phase of the object-modified radiation is compared. The size and position of the hologram aperture 164 is chosen primarily for the view desired of the object.

Figure 2:
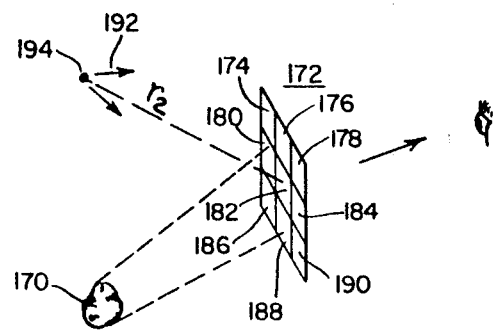
FIG. 2 illustrates reconstructing a hologram constructed as shown in FIG. 1.

In ordinary holography, the specified hologram aperture 164 would contain throughout a photosensitive material such as photographic film to record the interference pattern. Upon illumination with the reconstructing beam related in curvature and position relative to the photosensitive sheet material to that of the reference radiation 168 during its construction, an actual size image of the object will be reconstructed located the same distance from the photosensitive sheet material as was the object during construction of the hologram. However, the hologram reduction technique of this invention results in an undistorted demagnified image 170, as shown in FIG. 2, reconstructed from a hologram 172 which is reduced in area from the hologram aperture 164.

Referring again to FIG. 1, holographic information of the object in the hologram aperture 164 sampled according to this invention, as a specific example, is recorded over the shaded areas 174-190. These areas are then joined together side by side to form the reduced size hologram 172 of FIG. 2. The sampled areas 174 through 190 should be periodically placed throughout the hologram aperture 164, shown as distance "A" from each other. The distance $a$ is a dimension of the sampled area. It has been found that the image demagnification may be predetermined by controlling the ratio of these distances. An image magnification ratio "M" may be defined as:

$$M = a/A \quad (1)$$

That is, the image 170 will have dimensions equal to those of the object 160 multiplied by the magnification ratio $M$.

In order to reconstruct an undistorted image demagnified according to equation (1), there is a further restriction that must be observed. The relationship between the radius of curvature $r_1$ of the reference radiation wavefront 168 used in constructing the hologram and the radius of curvature $r_2$ of reconstructing radiation wavefront 192 generated from an actual or an apparent point source 194 must be substantially the following:

$$r_2 = M r_1 \quad (2)$$

It can be recognized that any standard radiation source can be used as the reference source 166 and/or the reconstructing radiation source 194. If the reference radiation 168 is collimated (that is, $r_1$ is infinite) then the reconstructing radiation 192 should also be collimated. In any event, the reconstructing radiation should strike the hologram 172 with the same angular relationship therewith as the reference radiation 168 striking the hologram aperture 164.

Throughout this discussion, it has been assumed that the wavelength of the reconstructing radiation 192 will be the same as the wavelength of the reference radiation 168. This is necessary in order to reconstruct a demagnified image without substantial distortions. However, the image demagnification technique of this invention may also be used in conjunction with a wavelength change or some other method of image demagnification. The advantage of hologram size reduction according to this invention is that it does not itself add any distortion to an image being processed through a holographic system.

An example of a specific technique for forming the reduced hologram according to this invention is to place photographic film in a plane at the hologram aperture 164 and expose it to object-modified radiation and to reference radiation, thereby forming a hologram. This hologram is then cut into pieces according to the pattern illustrated in FIG. 1 with the shaded areas 174–190 spliced together to form a reduced size hologram 172 shown in FIG. 2. The remaining portions of the photographic film are discarded. Many other specific techniques for carrying out this invention will become apparent in light of the description herein.

Figure 3:
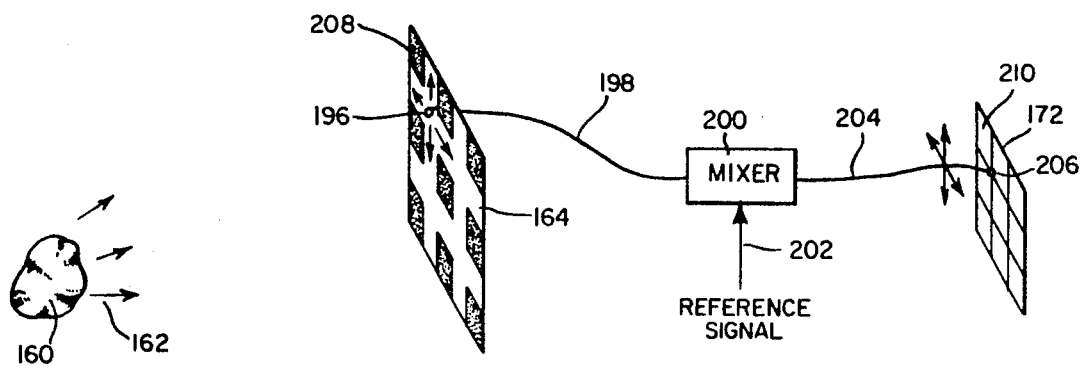
FIG. 3 illustrates an alternate technique for constructing a reduced size hologram by sampling.

The present hologram reduction technique may also be practiced according to the methods of scanned holography wherein holographic information of an object contained within a hologram aperture is converted into electronic impulses which delivers holographic information as a function of time. Referring to FIG. 3, the object 160 which is illuminated with coherent radiation reflects alternatively, (some objects may be of the transmittive type) an object-modified beam 162 which strikes the hologram aperture 164. This aperture is scanned with a radiation receiver 19 which converts the radiation received into electrical impulses and transmits them along an electrical circuit 198 to an electronic processor 200 wherein the phase of the received electrical signal is compared with that of a reference radiation signal 202 that is coherent with the object-illuminating radiation. Holographic information of the object is carried by an electrical circuit 204 to drive a transducer 206 which converts the electronic signal holographic information into visible radiation which may be recorded at a hologram detector 172. The reference signal 202 is generally mixed with the object-received signal in the electronic processor 200 with the aid of appropriate phase shifting devices to place the reference signal off-axis with respect to the object-modified radiation 162 as it strikes the hologram aperture 164 and to simulate reference radiation of the predetermined radius of curvature. This is equivalent to the situation as illustrated in FIG. 1 wherein a reference source of radiation is utilized to flood the hologram aperture 164 and produce the information carrying interference pattern. Receiver scanning techniques in ultrasonic holography are discussed generally by Preston and Kreuzer in Applied Physics Letters, Vol. 10, No. 5, Pg. 150, Mar. 1, 1967. In the configuration of FIG. 3, the receiver 196 would generally be scanned in some sort of raster pattern over the entire aperture 164 and the radiation transducer 206 would be scanned in synchronism therewith. If ultrasonic energy is used for illuminating the object 160, the receiver 196 would be some kind of quartz transducer and the radiation transducer 206 would be an appropriate point light source for illuminating a photosensitive material which is the hologram detector 172' to construct a permanent hologram.

To carry out the present invention, the receiver 196 is not scanned over the entire area but is only scanned effectively over the sampled areas (shaded in FIG. 3) of the hologram aperture 164. The radiation transducer 206 is scanned in synchronism with the radiation receiver 196 as long as the receiver is within an area sampled. For instance, if the receiver 196 is scanned over the sampled area 208, the radiation transducer 206 is scanned over the area 210. While the receiver 196 is traveling between sampled areas, however, the radiation transducer 206 remains inoperative until the receiver comes into another area to be sampled wherein the radiation transducer 206 scans a corresponding area at the hologram detector 172. When the hologram detector 172 (usually photographic film when the radiation transducer 206 is a light source) is developed, a permanent hologram is formed which may be reconstructed according to the technique discussed with respect to FIG. 2.

Figure 4:
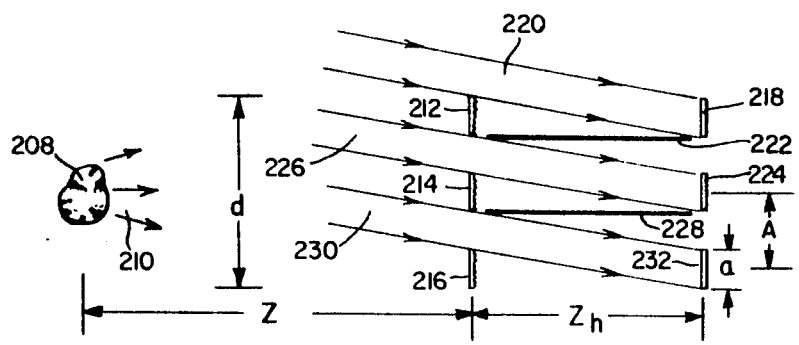
FIGS. 4 and 4a show construction and reconstruction of a hologram by a technique which includes reducing the spatial frequency recorded at the hologram.

Such a hologram reduction technique may be used in conjunction with the space-spatial frequency product reduction techniques described by K. A. Haines in the aforementioned copending patent application and two coauthored published articles. Referring to FIG. 4, an object 208 illuminated with coherent radiation in some convenient manner generates an object-modified radiation beam 210 to be holographically recorded. A hologram aperture is defined having a dimension $d$ and a position "Z" from the object determined in a manner to capture the object modified radiation for a desired field of view of the object through the aperture. A plurality of small dispersion screens 212, 214 and 216 are located periodically across the defined hologram aperture at the areas to be sampled in carrying out the hologram reduction technique. A plurality of hologram detectors 218, 224 and 232 are placed in a plane located a distance behind the plane of the diffusion screens $Z_h$ to give the desired reduction in the spatial frequencies recorded by the detectors. The dispersion screen 212 disperses that portion of the object-modified radiation 210 striking it for recordation at the corresponding small detector 218. A portion 220 of a collimated reference beam strikes the detector 218, thereby to record thereon interference between dispersed object-modified radiation and reference radiation. An opaque nonreflective divider 222 is located to prevent light other than that dispersed by the dispersion screen 212 from striking the detector 218 and also to contain the light dispersed by the dispersion screen 212 from striking the other detector portions.

Similarly, the dispersion screen 214 disperses object-modified radiation for capture by the detector portion 224 in interference with a reference beam portion 226 and isolated by an opaque nonreflective divider 228. The object-modified radiation dispersed by a dispersion screen 216 interferes with another reference beam portion 230 at the detector portion 232. The small hologram detecting areas 218, 224 and 232 may contain a photosensitive material such as photographic film for permanently recording the interference patterns. The areas of photographic film are then joined side by side to make a reduced size hologram 234 capable of reconstructing a demagnified image. Alternatively, these detecting areas may be scanned by a radiation receiver in the manner discussed with respect to FIG. 3 to construct a reduced size hologram which would eliminate the need for the reference beams 220, 226 and 230 since reference radiation may be introduced electronically.

Figure 4A:
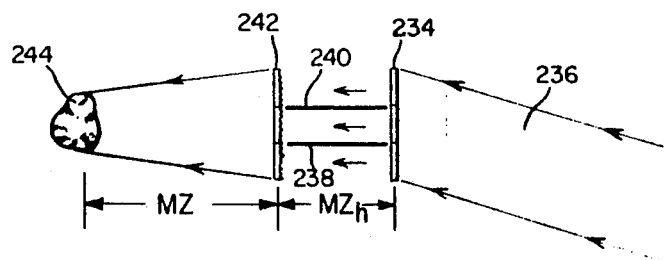

Referring to FIG. 4a, the composite reduced size hologram 234 is illuminated by a collimated beam of coherent light radiation 236 in order to reconstruct a pseudoscopic image of the dispersion screens and the object. The magnification factor M of images reconstructed from the hologram 234 is expressed in equation (1) with the parameters therein shown in FIG. 4. Opaque dividers 238 and 240 are utilized to prevent light dispersed by one hologram section from flooding that dispersed by another hologram section. A dispersive medium 242 is placed in the location where a real image of the dispersion screen is reconstructed from the hologram in order to remove diffusion screen information from the diffracted beam, thereby forming an image 244 of the object 208. The dispersion screen 242 is composed of the small screens 212, 214 and 216 joined together.

It can be seen by the technique of FIGS. 4 and 4a that the data holographically recorded has been reduced and the image has been demagnified without distortion, a combination of factors especially desirable for data transmission and image reconstruction of live object scenes.

The diffusion screens 212, 214 and 216 may conveniently be pieces of a ground glass diffusion structure. Ground glass generally has one surface randomly roughened and imparts a random phase shift across a light wavefront passing therethrough. Alternatively, a diffusing structure having a periodically varying surface may be utilized. A preferred periodic structure has a parabolically varying surface, or the nearly equivalent sinusoidally varying surface. With either the random or periodic diffusion structure, the average period should be at least several times the resolution element size of the reconstructed wavefront as determined by the hologram construction geometry, to construct a hologram which will reconstruct an image having reduced resolution without an undesirable increase in background raise.

The invention herein has been described utilizing reference and reconstructing radiation having a uniform wavefront originating from an actual or apparent point radiation source. This restriction is usually observed in practicing holography because it is convenient but it should be understood that an irregular wavefront reference and reconstructing beam could alternatively be used. According to the hologram reduction aspect of the present invention, the best demagnified images are obtained when the reference radiation wavefront is appropriately scaled for reconstructing an image from the reduced size hologram.

Although the invention has been described with respect to specific embodiments, the underlying principle of the invention will suggest several modifications of the specific embodiments to those skilled in the art. It is, therefore, intended that the invention not be limited to the specific embodiments described but rather should be given the full range of protection as falls within the spirit and scope of the appended claims.

I claim:

1. A method of making a hologram and reconstructing a demagnified image of an object therefrom, comprising the steps of:
   producing coherent radiation that has been modified by said object,
   providing a hologram aperture located to intercept the object-modified radiation,
   sampling the radiation striking the hologram aperture at a plurality of areas of substantially the same size located periodically throughout the aperture in two dimensions with space between each of said areas, a dimension of the sampled areas and a period of recurrence of the sampled areas chosen so that their ratio is equal to a desired image magnification factor,
   comparing the phase of noncollimated reference radiation having a predetermined radius of curvature with the object-modified radiation striking the hologram aperture,
   holographically recording the intensity and phase of the object-modified radiation striking the sampled areas at locations adjacent to one another to form a hologram having an overall size smaller than said hologram aperture, thereby to discard information carried by the object-modified radiation that strikes the hologram aperture in the spaces intermediate of said plurality of sampled areas, and
   illuminating the reduced size hologram with a noncollimated radiation wavefront having a radius of curvature substantially equal to the predetermined radius of curvature of said reference radiation multiplied by the image magnification ratio.

2. The method according to claim 1 wherein said object modified and reconstructing radiation is electromagnetic radiation of substantially the same frequency and within the visible spectrum.

3. The method according to claim 1 wherein the step of sampling the radiation striking the hologram aperture includes scanning a substantially point radiation receiver over said plurality of spatially distinct areas within the hologram aperture.

4. A method of holographically reconstructing a demagnified image of an object without magnification distortion, information of said object being carried by object-modified electromagnetic radiation, comprising the steps of:
   providing a hologram aperture in a position to intercept said object-modified electromagnetic radiation,
   directing noncollimated reference electromagnetic radiation onto said hologram aperture at a finite angle with said object-modified radiation, said reference radiation being mutually coherent with said object-modified radiation, whereby an off-axis holographic interference pattern is produced across said hologram aperture,
   sampling said interference pattern at a plurality of spatially distinct areas recurring at regular intervals across said aperture in two dimensions, said areas each having substantially the same shape and area,
   recording the sampled areas of said interference pattern immediately adjacent each other, thereby to form a continuous reduced size hologram with portions of the interference pattern across said aperture that fall between the sampled areas being discarded, said hologram thereby having an overall size that is smaller than said hologram aperture, and
   illuminating said reduced size hologram with noncollimated reconstructing electromagnetic radiation of substantially the same wavelength as said mutually coherent radiation utilized in producing the off-axis holographic interference pattern, said reconstructing radiation additionally having a radius of curvature equal to that of said reference radiation when multiplied by a ratio of a sampled area dimension and a period of recurrence of the sampled areas, whereby a demagnified image of the object is reconstructed that is substantially free of magnification distortion that would be introduced by other holographic demagnification techniques.

5. The method according to claim 4 wherein the object-modified electromagnetic radiation is dispersed before striking the hologram aperture.

6. The method according to claim 4 wherein the dimensions of said sampled areas are made equal to or less than the resolution element size of the particular holographic system utilized.

7. A method of constructing a data reduced hologram of an object and reconstructing a demagnified image of the object from the hologram, comprising the steps of:
   illuminating the object with coherent radiation, thereby to produce object-modified radiation, providing a hologram aperture of a given size in the path of said object-modified radiation a distance from said object, whereby the field of view of said object is fixed, dispersing the object-modified radiation at a plurality of areas of substantially the same size located periodically across the hologram aperture in two-dimensions with space between each of the dispersive areas, a dimension of the dispersive areas and a period of recurrence of the dispersive areas across the hologram aperture being arranged for their ratio to be equal to a desired image magnification factor, locating a detecting plane a distance from said hologram aperture in dispersed object-modified radiation, sampling the dispersed object-modified radiation striking the detecting plane at a plurality of areas of substantially the same size located periodically across the detecting plane in two dimensions with space between each of the detecting areas, the size and spacing of said detecting areas being substantially the same as the size and spacing of the dispersive areas across the hologram aperture, limiting exposure of each detecting area to dispersed object-modified radiation from a single exclusive dispersive area, comparing the phase of reference radiation having a predetermined radius of curvature with the dispersed object-modified radiation striking each of said hologram detectors, holographically recording the intensity and phase of the dispersed object-modified radiation striking each of said hologram detecting areas, positioning the recorded detectors adjacent one another to form a reduced size hologram thereby discarding information carried by dispersed object-modified radiation that strikes the detecting plane in the spaces intermediate of said plurality of hologram detecting areas, illuminating the reduced size hologram with a radiation wavefront having a radius of curvature substantially equal to the predetermined radius of curvature of said reference radiation multiplied by said image magnification ratio, thereby reconstructing an image carrying diffracted beam from said hologram, and dispersing said image carrying diffracted beam a distance from said hologram that is equal to the distance between the detecting plane and the hologram aperture during recording of the hologram and multiplied by said image magnification factor, said diffracted beam dispersion being a scaled replica of the dispersion across said hologram aperture during construction of the hologram, said scaled replica having individual dispersive areas joined together without space therebetween, said dispersive areas being of substantially the same size and having substantially the same dispersive properties as correspondingly positioned dispersive areas across said hologram aperture.